No. 724,575. PATENTED APR. 7, 1903.
C. T. HAWLEY.
STOP MOTION FOR MACHINES FOR PREPARING FIBROUS MATERIAL.
APPLICATION FILED AUG. 26, 1902.
NO MODEL. 4 SHEETS—SHEET 1.
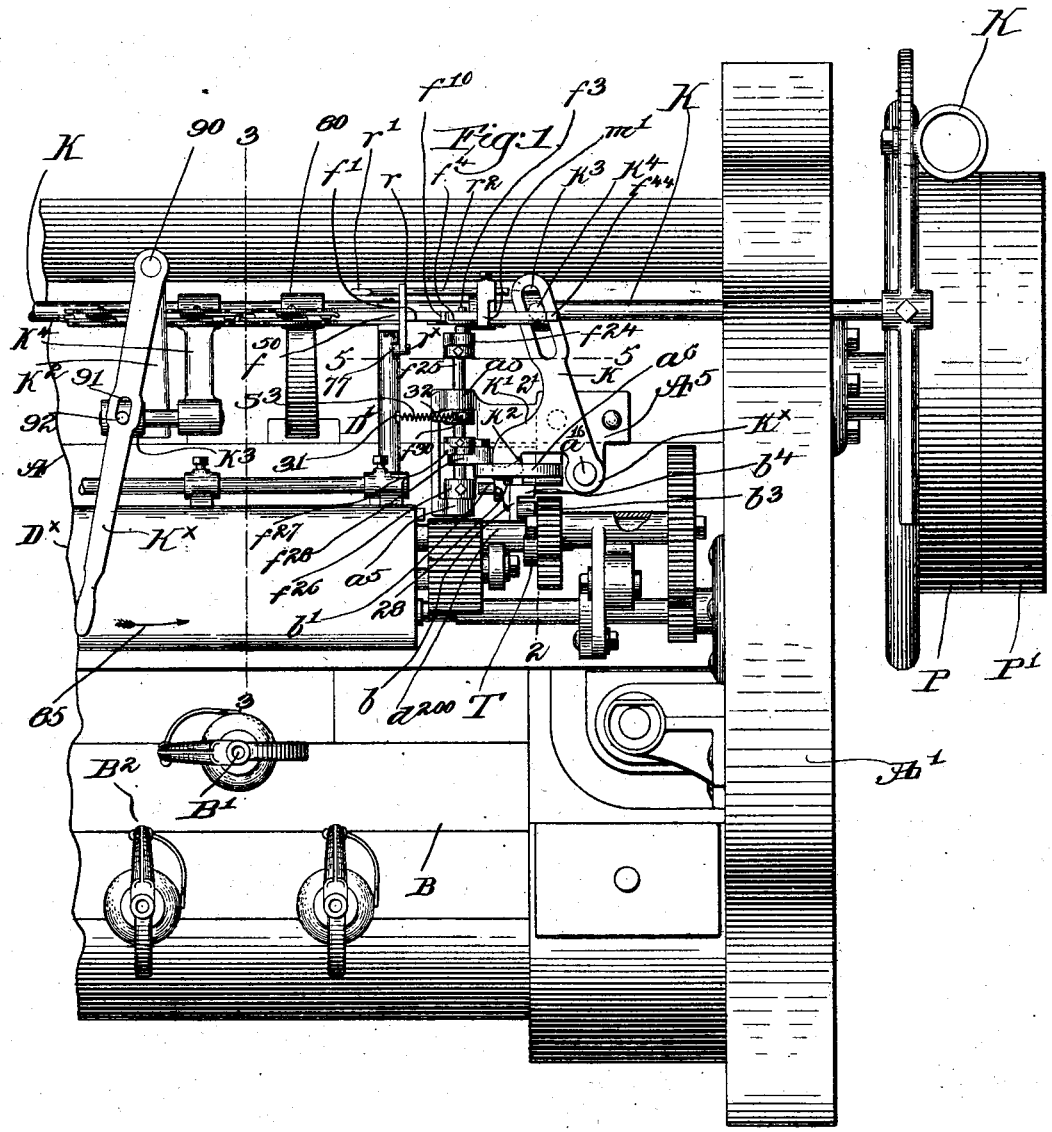

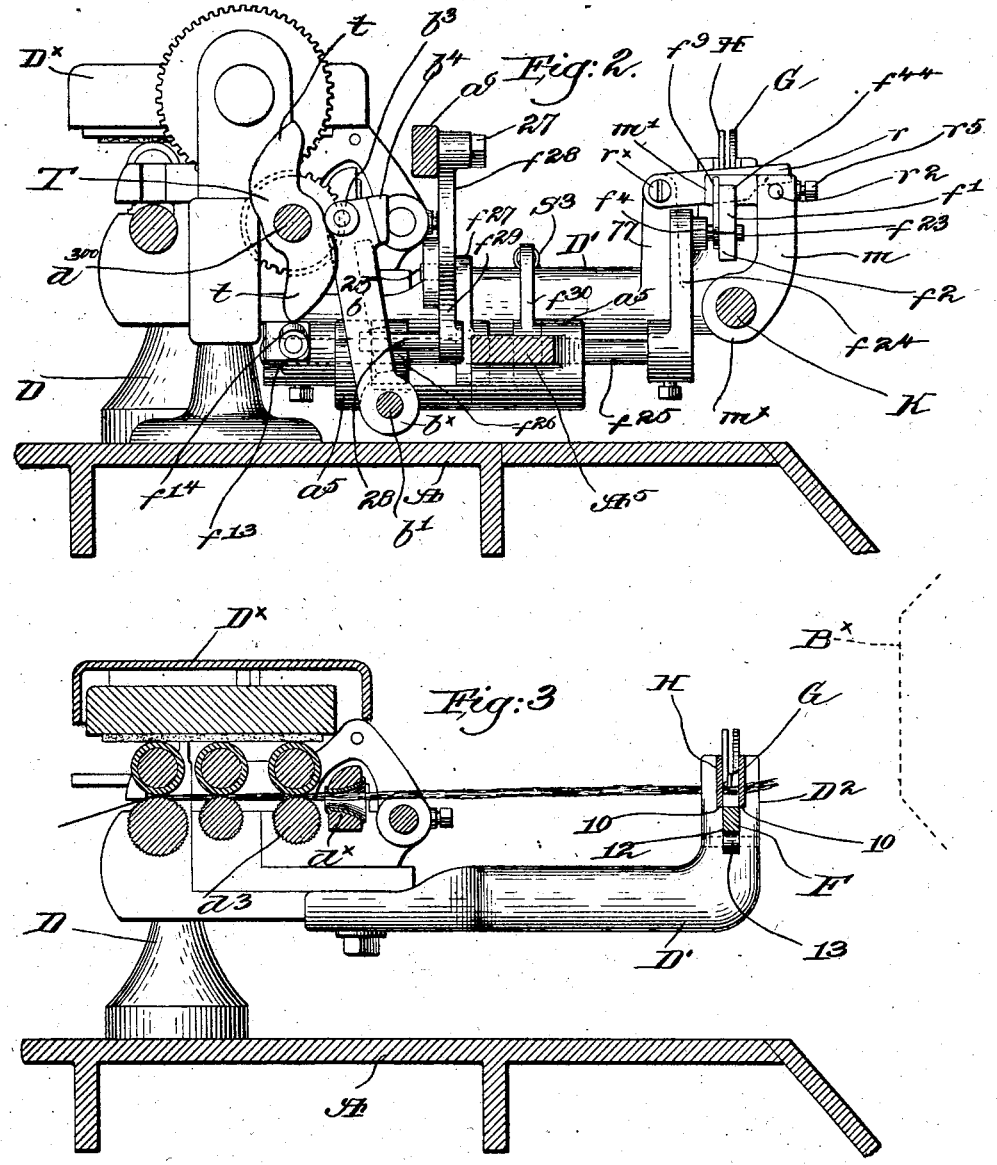

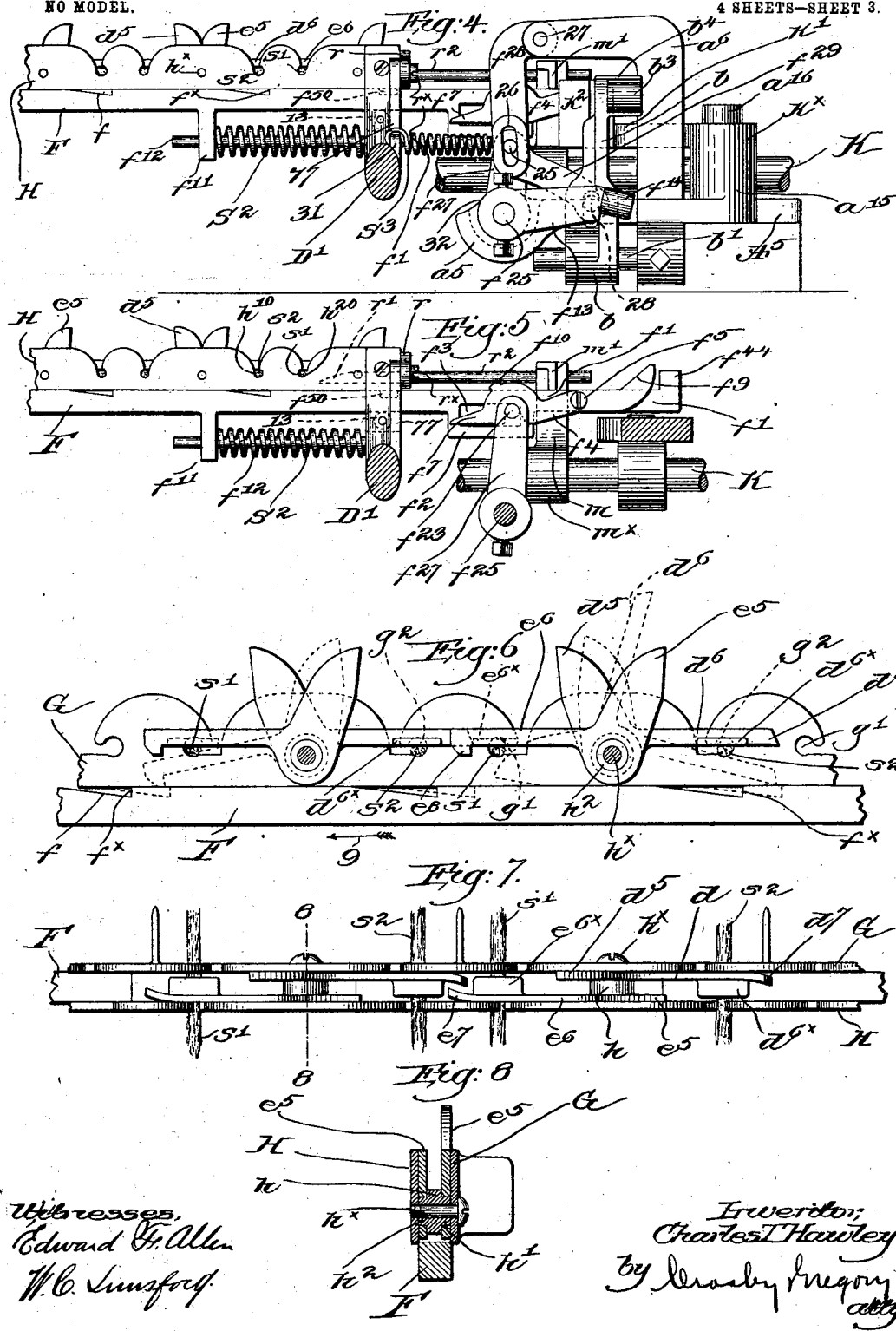

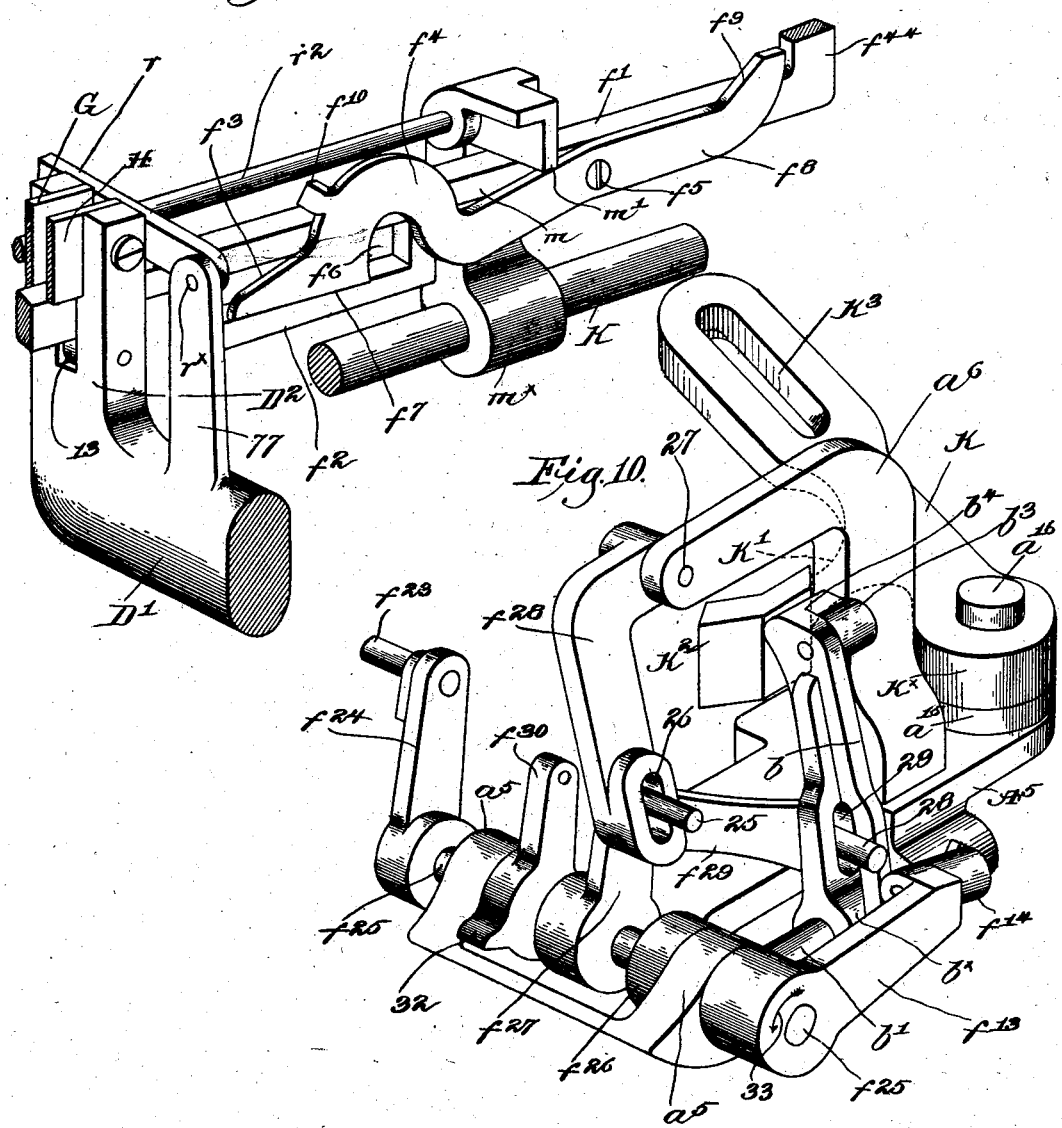

UNITED STATES PATENT OFFICE.

CHARLES T. HAWLEY, OF GARDNER, MASSACHUSETTS, ASSIGNOR TO DRAPER COMPANY, OF HOPEDALE, MASSACHUSETTS, A CORPORATION OF MAINE.

STOP-MOTION FOR MACHINES FOR PREPARING FIBROUS MATERIAL.

SPECIFICATION forming part of Letters Patent No. 724,575, dated April 7, 1903.

Application filed August 26, 1902. Serial No. 121,066. (No model.)

*To all whom it may concern:*

Be it known that I, CHARLES T. HAWLEY, a citizen of the United States, residing at Gardner, in the county of Worcester and State of Massachusetts, have invented an Improvement in Stop-Motions for Machines for Preparing Fibrous Material, of which the following description, in connection with the accompanying drawings, is a specification, like characters on the drawings representing like parts.

This invention relates to machines for preparing fibrous material—such as slubbing, intermediate, and roving frames—wherein a plurality of slivers are led through guides and united into one roving by drawing-rolls preparatory to being twisted, as by a flier, and wound upon a suitable bobbin. It is necessary in apparatus of such character to stop the frame as a whole when for any reason the continuity of any roving is interrupted and when a sliver of any set breaks, because if a bobbin is permitted to run without roving for any considerable length of time it is too small when pieced up for the difference in speed then found and there is too small surface speed relative to the flier, for reasons well known to those skilled in the art, and the roving is not wound upon the bobbin as fast as it is delivered by the rolls. Thus it is impossible to run a bobbin materially smaller than the others in the set.

In another application, Serial No. 91,343, filed by me the 27th day of January, 1902, I have shown and described a novel stop-motion for apparatus of the class above referred to whereby the apparatus as a whole is stopped automatically by or through the breakage of a sliver of any set, so that not only are singles prevented, but the output of the frame is made substantially uniform and very perfect.

My present invention has for its object the production of an improved stop-motion for the same class of apparatus, the construction and arrangement of the mechanism forming the subject-matter of this application being such that the frame may be readily started after it has been stopped automatically without necessitating turning over by hand—that is to say, I have herein provided means for effecting such position of the parts upon stopping that everything is clear for starting up when the operator moves the shipper. I have also improved the detector, whereby a better operation thereof is secured with practically no tendency of the sliver to sag between the front and back guide-plates. These and other novel features of my invention will be fully described in the subjoined specification and particularly pointed out in the following claims.

Figure 1 is a top or plan view of the driving end of a drawing-frame of the general type hereinbefore referred to, the stop-motion being shown in the position assumed when the frame is in operation. Fig. 2 is a transverse sectional detail, enlarged, on the line 2 2, Fig. 1, looking toward the left. Fig. 3 is a similar view, also enlarged, on the line 3 3, Fig. 1, also looking toward the left and with some of the parts beyond the section-line omitted. Fig. 4 is an enlarged detail, in front elevation, of the stop-motion and its controlling means, the drawing-rolls being omitted. Fig. 5 is a similar view of the parts back of a vertical longitudinal section plane indicated by the line 5 5, Fig. 1, showing the connection between the feeler and the actuating mechanism thereof. Fig. 6 is an enlarged detail, in front elevation, of the detectors and the coöperating feeler, the front guide-plate for the slivers being omitted. Fig. 7 is a top or plan view thereof with the front guide-plate in position. Fig. 8 is a vertical sectional detail on the line 8 8, Fig. 7, looking toward the left. Fig. 9 is an enlarged perspective detail of the means for releasing the feeler from its actuating mechanism when the stop-motion operates; and Fig. 10 is a similar view of a portion of the stop-motion and its controlling means to be described, the operating tappet-cam being omitted.

Referring to Fig. 1, the main frame A, the box-like portion A', containing the usual driving mechanism, the spindle-rail B, rotatable spindles B', and their fliers B², the stands D for the sets or heads of drawing-rolls, the roll-cover D$^\times$, and the trumpet $d^\times$, Fig. 3, may be and are all of well-known and usual construction, the drawing-rolls being shown in section in said Fig. 3, the slivers being drawn from bobbins B× at the back of the frame. (See dotted lines in Fig. 3.) Brackets D' are secured to and extend rearwardly from the stands D, and their upturned ends $D^2$ are vertically notched and shouldered at 10, Fig. 3, two parallel and longitudinal guide bars or plates G H resting on the shoulders and being secured to the brackets, guide-eyes $g$ and $g'$ in the plate G being arranged in pairs back of each set of rolls for the slivers $s'$ $s^2$ of each pair. (See Fig. 6.) The guide-plates are held together by a series of screw-studs $h^×$, Figs. 6 to 8, which are shown as passing through plate G and screwed into plate H, a sleeve $h$, having reduced ends $h'$ and $h^2$, surrounding each stud between the plates to maintain them properly separated while holding them firmly in position, the ends $h'$ and $h^2$ of the sleeves forming fulcrum-seats for the detectors, to be described. The front plate H is provided with pairs of guide-eyes $h^{10}$ $h^{20}$ in front of the pairs of eyes $g$ $g'$ for the slivers of a set.

As in my other application, referred to, I have herein provided two series of detectors mounted to rock upon the fulcrum-seats $h'$ $h^2$, respectively, the body portions of the sleeves $h$ maintaining the requisite separation between the detectors, which rock in vertical paths between the guide-plates. The detectors mounted on the seats $h'$ comprise each an upturned head $d^5$ and a lateral arm $d^6$, extended from the base of the head, said arms extending to the right, Figs. 6 and 7, and long enough to cross the paths of the slivers $s^2$ of each set between the guide-eyes $g$ $h^{10}$ and adjacent the plate G. Each arm $d^6$ is bent forward slightly at its extremity, as at $d^7$, and a lateral extension or foot $d^{6×}$ on the arm is provided to rest upon the sliver, so that a broad bearing-surface is provided, the weight of the detector which must be sustained by the sliver being thereby distributed over substantially the entire portion of the sliver between the plates G and H, so that the tendency of the sliver to sag between such plates, which is greatly intensified if any pressure thereon is concentrated, is practically eliminated. This is of importance, because sagging of the sliver tends to weaken it and also is apt to permit the detector to move into operative position when unnecessary. The front series of detectors, mounted on the seats $h^2$, comprise upright heads $e^5$ and lateral arms $e^6$, but extended to the left, Figs. 6 and 7, and crossing the paths of the slivers $s'$ between their guide-eyes, the extremity of each arm being bent rearwardly, as at $e^7$, and shaped on their edges to form downturned hooks $e^8$. A lateral extension or foot $e^{6×}$ is formed on each arm to rest upon the sliver and corresponding in function to the feet $d^{6×}$ described. By referring to Fig. 7 it will be seen that the detectors of the two series do not interfere with each other, and it will be manifest that two detectors, one from each series, coöperate with the two slivers of each set. The foot of each detector normally rests upon and is supported by an intact sliver, the detectors being thereby maintained in full-line inoperative position, Fig. 6, the obtuse angle between each head and arm serving to render the head a counterpoise to reduce the strain upon the sliver to a minimum.

The notches in the upturned ends of the brackets D' are extended below the shoulders 10, as at 12, Fig. 3, to receive and guide a longitudinally-movable feeler F, which is vertically supported on suitable rotatable rolls 13, mounted in the bottoms of the notches 12, so that friction is reduced and the power required to move the feeler is very slight. The feeler is shown as a long bar having on its upper face a series of notches $f$ to present upright square shoulders $f^×$, which move back and forth below the free ends of the detector-arms as the feeler is reciprocated. Upon breakage or undue attenuation of a sliver, so that its detector cannot be held in inoperative position, the detector will rock on its fulcrum-seat, and the extremity of its arm will engage one of the shoulders $f^×$, arresting the movement of the feeler and stopping the frame automatically by or through means to be described. As in my other application, the feeling stroke of the feeler (indicated by arrow 9, Fig. 6) is effected by yielding means, the opposite or non-feeling stroke being effected positively, as will be described. If a detector of the back series is released, the extremity $d^7$ of its arm drops into a notch $f$ and engages the adjacent shoulder $f^×$, stopping the movement of the feeler, the stopping strain on the detector-arm being compressive, while the strain on the arm of a released detector of the front series is tensile, as the hook $e^8$ will in such case engage the nearest shoulder $f^×$ and stop the feeler. The dotted-line position of a released detector of each series in Fig. 6 shows them just ready to drop into coöperative engagement with the feeler, and at the right-hand end of the said figure I have also shown in dotted lines one of the front detectors thrown over for piecing up its sliver. The end of the feeler nearest the driving end of the frame is longitudinally extended, as at $f'$, and provided with a depending enlargement $f^2$, having a longitudinal slot $f^3$ therein, and a latch $f^4$ is fulcrumed at $f^5$ on the side of the extension $f'$. The latch is extended in front of the slot $f^3$ and has a notch $f^6$ in its lower edge and a toe $f^7$ beyond the notch, while on the opposite side of its fulcrum the latch is extended to form a tail $f^8$, having a cam-surface $f^9$ for a purpose to be described. A lateral ear $f^{10}$ on the latch is adapted to engage the top of the extension $f'$ at times to limit the downward movement of the heavier part of the latch—that is, the part having the notch and toe referred to. The feeler has a depending lug $f^{11}$, Figs. 4 and 5, provided with a hole to loosely receive a guide-rod $f^{12}$, which is rigidly secured to the right-hand one of the brackets D', and a spring $S^2$ surrounds the rod between the bracket and the lug, said spring by its expansive force moving the feeler on the feeling stroke, (indicated by arrow 9,) the positively-actuated opposite stroke of the feeler compressing the spring. A stand $A^5$, secured to the top of the main frame, is provided with bearings $a^5$, Figs. 1 and 10, for a transverse rock-shaft $f^{25}$, having at its rear end an upturned arm $f^{24}$, provided with a lateral pin $f^{23}$ near its upper end. This pin extends through the notch $f^6$ of the latch and projects into the slot $f^3$ in the extension of the feeler when the frame is running, and so long as the latch and pin are in engagement and the shaft $f^{25}$ is rocked the feeler will be reciprocated. A second upturned arm $f^{27}$, fast on the rock-shaft $f^{25}$, has a lateral pin 25, which passes through an elongated slot 26 (see Fig. 10) in a bent lever $f^{28}$ $f^{29}$, fulcrumed at the upper end of the part $f^{28}$ to an upturned and overhanging bracket $a^6$, as at 27. The part $f^{28}$ and the rocker-arm $f^{27}$ form a species of toggle, with a slot-and-pin connection 26 25, the part $f^{29}$ of the bent lever being downwardly inclined toward the back of the frame and having a long lateral pin 28 secured to it near its free end. A collar $f^{26}$ is secured to the shaft $f^{25}$ at one side of one of the bearings $a^5$, and on the opposite side of the said bearing an arm $f^{13}$ is rigidly secured to the shaft, which is termed the "feeler rock-shaft," said collar and arm preventing longitudinal movement of such shaft. The arm $f^{13}$ is turned toward the driving end of the frame and is provided at its free end with a roll $f^{14}$ in the path of the tappets $t$ $t$ of a tappet-cam T, (best shown in Fig. 2,) secured to the shaft $d^{300}$, attached to or forming a continuation of the lower back rolls $d^3$. The pin 28 on the part $f^{29}$ of the bent lever referred to extends loosely into a longitudinal slot 29 in a bunter $b$, (see Fig. 10,) shown as an upturned arm, having its hub $b^\times$ mounted to rock and also to slide longitudinally on a fixed stud $b'$, secured to the stand $A^5$ at right angles to the feeler rock-shaft. A friction-roll $b^3$ is mounted on the upper end of the bunter, and the latter has an enlargement $b^4$ behind the roll for a purpose to be described. The feeler rock-shaft is shown in Fig. 10 as having a fourth upturned arm $f^{30}$ fast upon it, and one end of a spring $S^3$ is attached to the free end of the arm, the other end of the spring being secured to a fixed part of the apparatus, as an ear 31, Fig. 4, on the nearest bracket D'. A lug 32 on the hub of the arm is adapted to engage the edge of the stand $A^5$ and limit angular movement of the feeler rock-shaft in the direction of arrow 33, Fig. 10, the spring $S^3$ tending to so turn the rock-shaft, these springs $S^2$ and $S^3$ at times acting together with such tendency. The spring $S^3$ serves to keep the roll $f^{14}$ in operative engagement with the tappet-cam T. As each tappet $t$ engages the roll the arm $f^{13}$ is depressed and the rock-shaft $f^{25}$ is turned oppositely to arrow 33, so that through the arm $f^{24}$ and its described connection with the feeler F the latter will be positively moved for the non-feeling stroke, the spring $S^3$ returning the rock-shaft after the point of the tappet passes the roll $f^{14}$, the spring $S^2$ at the same time imparting the feeling stroke to the feeler, so that if the latter is arrested by a released detector the strain on the detector will be due only to the power of such spring, for at such time the influence of the spring $S^3$ on the feeler is not operative, as will be described. The feeler is reciprocated twice for each complete rotation of the cam T, as will be manifest. Each depression of the arm $f^{13}$ by a tappet is accompanied by a swinging movement of the bent lever $f^{28}$ $f^{29}$, so that the pin 28 slides the bunter $b$ to the right on the stud $b'$ into the position shown in Figs. 1 and 10, bringing the roll $b^3$ into the path of the tappet $t$, whose point is just passing over the roll $f^{14}$, (see Fig. 2;) but normally the feeling stroke of the feeler will take place and the return rotation of the rock-shaft $f^{25}$ will act to slide the bunter back on the stud $b'$ before the tappet can engage its roll. When, however, the feeling stroke of the feeler is arrested by a released detector, the rock-shaft $f^{25}$ and parts fast thereon are held in the position shown in Fig. 10, with the bunter in operative position, and its roll will be engaged by the tappet after leaving the roll $f^{14}$, swinging the bunter back, or to the right, Fig. 2, on the stud $b'$, the long pin 28 traveling in the slot 29. Such movement of the bunter effects automatically the stoppage of the entire frame, as will now be described.

More particularly referring to Fig. 1, a shipper-rod K, longitudinally slidable in bearings 80, passes through the part A' of the frame and is provided with a belt-guide K' to shift the driving-belt (not shown) from the fast pulley P to loose pulley P', and vice versa, mounted on the main driving-shaft of the frame. A shipper $K^\times$ is fulcrumed at 90 on a fixed bracket $K^2$ and connected by a slot-and-pin connection 91 92 with a slide $K^3$, having an arm $K^4$ rigidly secured to the shipper-rod, so that the latter may be moved by hand to stop as well as start the frame.

The stand $A^5$ is provided with a boss $a^{15}$, having a central upturned fulcrum-stud $a^{16}$, which receives the hub $k^\times$ of a horizontally-swinging knock-off lever $k$ $k'$, the arm $k'$ extending back of the bunter $b$ and having an upturned abutment $k^2$, Figs. 1 and 10, which is immediately back of and in the operative path of movement of the bunter enlargement or head $b^4$ when the latter is in the position shown in said figures. A longitudinal slot $k^3$ in the arm $k$ receives a pin $k^4$ on the shipper-rod K, as clearly illustrated in Fig. 1, and the shipper-rod also has secured to it the hub $m^\times$ of an upturned arm $m$, which rises above and back of the feeler extension $f'$, and, as well shown in Fig. 9, the upper end of the arm is extended toward the front of the frame at $m'$ across the feeler extension and overhanging the latch $f^4$ to constitute a tripping device, the movement of the shipper-rod K to throw off the power causing the trip $m'$ to engage and depress the cam end $f^9$ of the latch-tail $f^8$, and thereby lift the latch, so that the pin $f^{23}$ is released from the notch $f^6$. Immediately the spring $S^3$ acts to turn the feeler rock-shaft $f^{25}$ in the direction of arrow 33, Fig. 10, and the pin $f^{23}$ swings to the left, Figs. 4 and 5, beneath the toe $f^7$ of the latch, it being remembered that the feeler F is held by a released detector, the slot $f^3$ in the feeler extension permitting the specified movement of the pin when the latch $f^4$ is tripped. The stop 32 will limit the retractile movement of the rock-shaft $f^{25}$ at such time, and it will be remembered that as soon as a tappet passes beyond the roll $f^{14}$ the spring $S^3$ can act, and if the feeling stroke of feeler F is arrested the backward swing of the bunter $b$, hereinbefore described, causes its head $b^4$ to engage the abutment $k^2$ of the knock-off lever, and the latter will be swung to the right, Fig. 1, thereby moving the shipper-rod K in the same direction and shifting the driving-belt to the loose pulley P'. Thus the frame is stopped automatically by or through the release of any detector due to breakage or great attenuation of its sliver.

From the foregoing description it will be manifest that the movement of the shipper-rod to throw off the power is accompanied by the release, uncoupling, or disconnection of the feeler from the means for imparting the positive non-feeling stroke thereto. I have also provided novel means for releasing the detector in engagement with the feeler from the strain of the spring $S^2$, so that the attendant can at once swing back such detector, piece up the sliver, turn the detector back, and again start the frame.

The feeler extension $f'$ has a transverse notch $f^{50}$ in its upper edge, (see dotted lines, Figs. 4 and 5,) and a detent or catch $r$ is fulcrumed at $r^x$ on an upturned ear 77 of the bracket D', (shown in said figures and in Fig. 9,) the detent extending across the top of the feeler extension, and its rear end is normally supported by the cam-like end $r'$ of a horizontal rod $r^2$, rigidly secured to the tripping device $m'$. The position of the parts when the frame is running is shown in the figures referred to; but when the trip is moved by the shipper-rod K as the power is shifted the rod $r^2$ will be moved simultaneously, withdrawing the cam end $r'$ from the free end of the detent $r$, so that the latter drops onto the feeler extension. The trip is located just above the feeler extension, and while the lower edge of the trip acts upon the cam $f^9$ to lift the latch $f^4$, and thereby release the feeler, the outer face of the trip strikes the upturned end $f^{44}$ of the feeler extension and moves the same far enough to the right, Figs. 4, 5, and 9, to bring the notch $f^{50}$ below the detent. The latter drops into the notch and locks the feeler in such position until the shipping mechanism is subsequently moved by the attendant to throw on the power, and the auxiliary movement imparted to the feeler to enable it to be locked acts to draw away from the released detector the feeler-shoulder $f^x$ which it had engaged when arresting the feeling stroke of said feeler. Thus the detector is not required to sustain the force of the spring $S^2$ for more than a very short space of time, as will be manifest from the foregoing description, and the attendant can at once tip back the detector to piece up. Of course the stoppage of the frame causes the shipper-handle $K^x$, Fig. 1, to swing in direction of arrow 85, and the reverse movement is imparted manually to the handle to start the frame. At such time the movement of the shipper-rod K to the left, Fig. 1, moves the trip $m'$ in the same direction, leaving the latch $f^4$ free, it being remembered that its toe $f^7$ is then resting on the pin $f^{23}$. At the same time the trip recedes from the part $f^{44}$ of the feeler extension and the beveled or inclined upper edge of the cam $r'$ slides under the detent $r$ and lifts the latter out of the notch $f^{50}$, restoring the feeler to the control of spring $S^2$, the latter expanding. The movement thus imparted by the spring to the feeler in the direction of the feeling stroke brings the notch $f^6$ of the latch over the pin $f^{23}$, and the latch immediately drops into operative engagement therewith, automatically effecting the operative connection of the feeler with the means for imparting the non-feeling positive stroke thereto. Manifestly, too, the return of the shipper-rod K to running position operates to swing the knock-off lever $k$ $k'$ into normal position, with the abutment $k^2$ in the path of the bunter-head $b^4$. A set-screw $r^5$ on the upper end of the arm $m$ engages the rod $r^2$ and holds it in adjusted position, so that the detent $r$ is rendered operative and inoperative at the proper times.

The pressure-relieving feature is of great utility, as time and labor is saved in piecing up, and the detector is quickly relieved from any strain due to arrest of the feeler. I have not claimed this feature broadly in this application, as my prior application contains claims commensurate therewith.

The prevention of "singles" and the stoppage of the apparatus is effected upon failure of any sliver, the term "failure" meaning breakage or the running out of a sliver from the bobbin from which it is drawn.

My invention is not restricted to the precise construction and arrangement herein shown and described, as the same may be modified or rearranged in various particulars without departing from the spirit and scope of my invention.

Having fully described my invention, what I claim as new, and desire to secure by Letters Patent, is—

1. In apparatus of the class described, a plurality of drawing and evening devices to act upon a corresponding number of sets of slivers, a common actuating mechanism for said devices, stop-motion detectors maintained inoperative by intact individual slivers, a normally vibrating feeler to be engaged and arrested on its feeling stroke by a released detector, means to yieldingly effect the feeling stroke of the feeler, means to positively actuate it on the opposite stroke, stopping means for the apparatus, operative by or through arrest of the feeler, and mechanism controlled by actuation of the stopping means to disconnect the feeler and its positive actuating means.

2. In apparatus of the class described, means to move and to guide a plurality of sets of slivers in pairs, common actuating mechanism therefor, detectors coöperating with and normally maintained inoperative by individual slivers, a vibratable feeler to coöperate with and be arrested on its feeling stroke by a released detector, yielding means to effect the feeling stroke of the feeler, means to positively move it on the other stroke, a connection between said means and the feeler, and stopping means for the actuating mechanism, operated by or through arrest of the feeler on its feeling stroke, such operation of the stopping means disengaging automatically the connection between the feeler and its positive actuating means.

3. In apparatus of the class described, means to move and to guide a plurality of sets of slivers in pairs, common actuating mechanism therefor, detectors coöperating with and normally maintained inoperative by individual slivers, a vibratable feeler to coöperate with and be arrested on its feeling stroke by a released detector, yielding means to effect the feeling stroke of the feeler, a latch carried by the feeler, a positively-vibrating member adapted to be operatively engaged by the latch, to effect the non-feeling stroke of the feeler, a trip for the latch, actuated by operation of the stopping means, to thereby release the feeler from the control of said vibrating member, and stopping means for the common actuating mechanism, operated by or through arrest of the feeler on its feeling stroke.

4. In apparatus of the class described, means to move and to guide a plurality of sets of slivers in pairs, common actuating mechanism therefor, detectors coöperating with and normally maintained inoperative by individual slivers, a vibratable feeler to coöperate with and be arrested on its feeling stroke by a released detector, yielding means to effect the feeling stroke of the feeler, means to positively move it on the other stroke, said means including a rocking shaft, and a rocker-arm carried thereby having a latch-pin, a latch on the feeler and normally engaging said pin, to connect the feeler and said positive actuating means, stopping means for the common actuating mechanism, operated by or through arrest of the feeler by a released detector, and a trip for the latch, operated by the stopping means, to disengage the latch and latch-pin and free the feeler.

5. In apparatus of the class described, means to move and to guide a plurality of sets of slivers, stop-motion detectors controlled by the latter, a normally reciprocating feeler to be engaged and arrested on its feeling stroke by a released detector, yielding means to effect the feeling stroke, positively-operating means normally controlling the feeler and moving it on its non-feeling stroke, stopping means operated by or through arrest of the feeler, and a device actuated by the operation of the stopping means to simultaneously release the feeler from the control of said positively-operating means.

6. In apparatus of the class described, means to move and to guide a plurality of sets of slivers, stop-motion detectors controlled by the latter, a normally reciprocating feeler to be engaged and arrested on its feeling stroke by a released detector, a spring to effect the feeling stroke, means including a positively-vibrating arm having a latch-pin, to move the feeler on its non-feeling stroke, a latch movable with the feeler and having a notch to receive the pin, to thereby connect the feeler with the vibrating arm, a trip to disengage the latch from the pin, stopping means for the apparatus, operated by or through arrest of the feeler by a released detector, and connections between the stopping means and the trip, to actuate the latter upon operation of the former.

7. In apparatus of the class described, means to move and to guide a plurality of sets of slivers, pivotally-mounted stop-motion detectors each having a broad transverse foot to rest upon a sliver, and a feeler-engaging portion projecting beyond the foot, the slivers normally maintaining the detectors inoperative, a normally reciprocating feeler to be engaged and arrested on its feeling stroke by a released detector, yielding means to effect the feeling stroke, means to positively effect the non-feeling stroke of the feeler, and stopping means operated by or through arrest of the feeler.

8. In apparatus of the class described, means to move and to guide a plurality of sets of slivers in pairs, common actuating mechanism therefor, detectors coöperating with and normally maintained inoperative by individual slivers, a vibratable feeler to coöperate with and be arrested on its feeling stroke by a released detector, yielding means to effect the feeling stroke of the feeler, means to positively move it on the other stroke, a connection between said means and the feeler, stopping means, including a shipper-rod, operated by or through arrest of the feeler on its feeling stroke, and a device mounted on the shipper-rod to automatically disengage the connection between the feeler and its positive actuating means when the shipper-rod is moved by the operation of said stopping means.

9. In an apparatus of the class described, stop-motion detectors controlled by the slivers, a feeler adapted to be arrested on its feeling stroke by a released detector, a spring to effect the feeling stroke, a latch pivotally mounted on the feeler and having a notch and an elongated toe, means to move the feeler positively on its non-feeling stroke, said means including a vibrating arm having a pin to enter the notch of the latch, stopping means for the apparatus, including a shipper-rod, said means being operated by or through arrest of the feeler, and a trip carried by said rod, to disengage the latch from the pin when the stopping means is operated, the latch-toe thereafter resting on the pin until the apparatus is started.

10. In apparatus of the class described, stop-motion detectors controlled by the slivers, a feeler adapted to be arrested on its feeling stroke by a released detector, yielding means to effect the feeling stroke, means to positively effect the opposite stroke of the feeler, a latch to connect the latter with such means, stopping means for the apparatus, operated by or through arrest of the feeler, a device actuated by the stopping means to render the latch inoperative and thereafter to move the feeler away from the arresting-detector, and locking means to automatically lock the feeler after it has been moved to free the detector, subsequent starting of the apparatus unlocking the feeler and effecting operative positioning of the latch.

11. In an apparatus of the class described, stop-motion detectors controlled by the slivers, a feeler adapted to be arrested on its feeling stroke by a released detector, yielding means to effect the feeling stroke, means to positively effect the opposite stroke of the feeler, stopping means for the apparatus, operated by or through arrest of the feeler, mechanism to automatically disconnect the feeler from the positive actuating means and to thereafter impart an auxiliary movement to the feeler to free the arresting-detector when the stopping means operates, a detent to automatically lock the feeler at the termination of such auxiliary movement thereof, and a releasing device to disengage the detent and feeler when the apparatus is started.

12. In apparatus of the class described, means to move and to guide a plurality of sets of slivers, stop-motion detectors controlled by the latter, a longitudinally-movable feeler to be engaged and arrested on its feeling stroke by a released detector, a spring to effect such stroke of the feeler, an extension on the feeler, having an upturned outer end, a latch pivotally mounted on the extension, means, including a positively-vibrating arm provided with a latch-pin, to coöperate with the latch and move the feeler positively on its non-feeling stroke, stopping means operated by or through arrest of the feeler, a trip actuated by the stopping means, to withdraw the latch from the latch-pin and thereafter to engage the upturned end of the feeler extension and move the feeler away from the arresting-detector, and a locking device to lock the feeler after such movement.

13. In apparatus of the class described, means to move and to guide a plurality of sets of slivers, stop-motion detectors controlled by the latter, a longitudinally-movable feeler to be engaged and arrested on its feeling stroke by a released detector, a spring to effect such stroke of the feeler, a latch mounted on the feeler, means to positively move the feeler on its non-feeling stroke, including a vibrating arm having a pin to be engaged by the latch, stopping means operated by or through arrest of the feeler, a tripping device actuated by the stopping means, to disengage the latch from the latch-pin, and means governed by the operation of the stopping means to relieve the arresting-detector from the strain of the feeler-spring after the latch is tripped.

14. In apparatus of the class described, stop-motion detectors normally maintained inoperative by the slivers, a feeler to be engaged and arrested on its feeling stroke by a released detector, a spring to effect its feeling stroke, means to positively move it on the opposite stroke, said means including a rocker-arm having a pin, a cam to rock it in one direction, and a spring to oppositely rock it, a latch carried by the feeler, to connect the latter with the rocker-arm, a bunter movable into and out of the path of said cam simultaneously with the rocking of the rocker-arm, arrest of the feeler holding the bunter in the cam-path, stopping means operated by the bunter when engaged by the cam, and a trip actuated by the stopping means to disconnect the latch and rocker-arm and permit return of the latter by its spring when the bunter has been moved by the cam.

15. In apparatus of the class described, means to move and to guide a plurality of sets of slivers, stop-motion detectors controlled by the latter, a longitudinally-movable feeler, a spring to move it in one direction, means including a cam to move it positively in the opposite direction, a latch connecting said means and the feeler, a rocking bunter bodily movable into and out of the path of movement of the cam simultaneously with the reciprocation of the feeler, arrest of the latter on its feeling stroke by engagement with a released detector maintaining the detector in the path of and to be rocked by the cam, stopping means operated by the rocking of the bunter, a device actuated by the stopping means to trip the latch and disconnect the feeler from its positively-moving means, and means operated by the trip subsequent to release of the latch to move the feeler and relieve the arresting-detector from pressure due to feeler strain.

16. In apparatus of the class described, stop-motion detectors normally maintained inoperative by the slivers, a longitudinally-movable feeler having an extension at one end provided with a notch and an upturned projection, a spring to yieldingly move the feeler in one direction, means, including a cam, to move it positively in the opposite direction, a latch between and normally connecting the feeler and said means, a bunter movable into and out of the path of the cam simultaneously with the reciprocation of the feeler, arrest of the latter by engagement with a released detector holding the bunter in the cam-path, stopping means operated by the bunter when engaged by the cam, a device actuated by the stopping means to trip the latch and thereafter to engage the projection on the feeler extension and move the feeler to relieve the arresting-detector from pressure, a detent, and a controlling device for the latter movable with the tripping device to permit the detent to enter the notch in the feeler extension and lock the feeler after the pressure upon the detector has been relieved.

17. In apparatus of the class described, stop-motion detectors to coöperate with the slivers, and normally maintained inoperative thereby, a vibrating feeler to be engaged and arrested by a detector released by pressure of its sliver, a spring to effect feeling stroke of the feeler, means, including a cam, to positively move the feeler in the opposite direction on the opposite stroke, a bunter operatively positioned in the path of and to be rocked by said cam upon arrest of the feeler, stopping means actuated by rocking movement of the bunter, and a device to disconnect the feeler from its positive actuating means upon actuation of the stopping means, and to effect an auxiliary movement of the feeler away from its arresting-detector to relieve the latter from strain.

18. In apparatus of the class described, stop-motion detectors controlled by and normally maintained inoperative by the slivers, a feeler to be engaged and arrested by a released detector, a spring to effect the feeling movement of said feeler, means to positively move it in the opposite direction, said means including a rock-shaft having a rocker-arm provided with a latch-pin and a tappet-cam, a bunter, a fulcrum on which it can rock and slide, connections between the rock-shaft and bunter to slide the latter into the path of the cam on the positive stroke of the feeler, arrest of the latter positioning the bunter in the path of and to be rocked by the cam, stopping means operated by the rocking movement of the bunter, a latch carried by the feeler and adapted to engage the latch-pin, a trip to disengage the latch from the latch-pin when the stopping means is operated, and a spring to move the rock-shaft in opposition to its cam.

In testimony whereof I have signed my name to this specification in the presence of two subscribing witnesses.

CHARLES T. HAWLEY.

Witnesses:
THATCHER B. DUNN,
MARY S. DUNN.